United States Patent [19]

Frank

[11] Patent Number: 5,032,773
[45] Date of Patent: Jul. 16, 1991

[54] DRIVE SYSTEM WITH A DRIVE MOTOR
[75] Inventor: Manfred Frank, Heustreu, Fed. Rep. of Germany
[73] Assignee: Siemens Aktiengesellschaft, Berlin & Munich, Fed. Rep. of Germany
[21] Appl. No.: 561,892
[22] Filed: Aug. 2, 1990
[30] Foreign Application Priority Data
Aug. 7, 1989 [EP] European Pat. Off. ........ 89114589.8
[51] Int. Cl.$^5$ ............................ H02P 6/02; H02P 5/40
[52] U.S. Cl. ...................................... 318/254; 318/138; 318/722; 318/724
[58] Field of Search ............... 318/138, 254, 439, 721, 318/722, 724

[56] References Cited
U.S. PATENT DOCUMENTS

| | | | |
|---|---|---|---|
| 4,777,414 | 10/1988 | Storath et al. | 318/138 |
| 4,827,196 | 5/1989 | Odell | 318/254 |
| 4,922,513 | 5/1990 | Joichi | 318/254 |
| 4,980,617 | 12/1990 | Tajima et al. | 318/254 |

Primary Examiner—Bentsu Ro
Attorney, Agent, or Firm—Kenyon & Kenyon

[57] ABSTRACT

A drive system has a drive motor with an associated current regulator. The current regulator controls the semiconductor contact elements of an electronic power stage, which is arranged downstream from the drive motor. This control is a function of a rotor-position sensor, whose rotor part is coupled to the rotor of this motor and has a number of magnetic poles corresponding to the number of poles of the drive motor. Furthermore, the current setpoint that is supplied to the current regulator is increased by overlapping an auxiliary voltage during the respective instant of commutation. Torque fluctuations which are caused by manufacturing tolerances can be then be eliminated. On the circumference of the rotor part, a number of magnetic field sensors corresponding to the number of phases m of the drive motor are mounted at a spatial distance of 360°/(p.m) to each other where p is the number of pole pairs of the drive motor. The auxiliary voltage is derived from the analog voltage signal of the magnetic field sensors.

20 Claims, 3 Drawing Sheets

DRIVE SYSTEM WITH A DRIVE MOTOR

BACKGROUND OF THE INVENTION

The invention relates to a drive system having a drive motor and, more particularly, to an improved drive system with at least one current regulator assigned to a drive motor, wherein a current regulator causes the semiconductor contact elements of an electronic power stage to be controlled as a function of a rotor-position sensor.

A drive system having a drive motor is disclosed in EP-A-0 261 540. In this system, the drive motor has at least one current regulator assigned which controls the semiconductor contact elements of an electronic power stage as a function of a rotor-position sensor. The electronic power stage is arranged downstream from the drive motor. The rotor-position sensor has a rotor part coupled to the drive motor and also has a number of magnetic poles corresponding to the number of poles of the drive motor. The current setpoint that is supplied to the current regulator is increased by overlapping an auxiliary voltage during the instant of commutation. The auxiliary voltage is required for adjusting the current setpoint within a separate winding that is mounted within the rotor of the motor. The separate winding could be the winding of a tachometer which is coupled to the motor rotor. A rotor-position sensor is provided in the disclosed drive system in order to control the positioning of the individual valves of the electronic power stage. It has been shown, however, that even in the case of great manufacturing precision, spatial shifts between the rotor-position sensor and the winding which generates the auxiliary voltage can arise. These shifts result in a shift in time of the auxiliary voltage, which is active in the commutation range, with regard to the actual instant of commutation. This causes irregularities in the torque characteristic.

Therefore, one of the problems that the invention addresses is to develop a drive system with a drive motor that eliminates these kinds of torque fluctuations caused by unavoidable manufacturing tolerances.

SUMMARY OF THE INVENTION

The present invention solves this problem by mounting on the circumference of the rotor part a number of magnetic field sensors corresponding to the phase number m of the drive motor at a spacial distance of $360°/(p \cdot m)$ relative to each other ($p$ = number of pole pairs of the drive motor). Then the auxiliary voltage is derived from the analog signal of the magnetic field sensors. Since the rotor-position sensor generates the auxiliary voltage itself, there is absolute agreement regarding the position of the auxiliary voltage and the instants of commutation. The auxiliary voltage is added to the current setpoint to adjust the current setpoint in the commutation range. Thus the rectification of the torque fluctuations is improved considerably. Moreover, the amplitude of the auxiliary voltage is independent of the speed.

The present invention also relates to a drive system that has magnetic poles on the rotor part of the rotor-position sensor such that the voltage signals delivered by the magnetic field sensors have a shape which deviates from the sinusoidal shape. The voltage signals of the individual magnetic field sensors change from one polarity to the other within specific angular dimensions and the voltage signals do not overlap in time. In addition, the drive system is such that the rectified a.c. voltage portion of the voltage signal is supplied to the current regulator as an auxiliary voltage. According to the present invention, this auxiliary voltage has a maximum value at each instant of commutation. By superimposing this auxiliary voltage with the current setpoint, one produces an increase in the current setpoint, and thus of the machine current in the commutation range. The slump in torque due to the non-ideal trapezoidal shape of the motor-EMF, which otherwise occurs in the commutation range, is offset by this increase in current, thus attaining a uniform torque characteristic.

The voltage signals, which are given off by the magnetic field sensors, have a trapezoidal shape. Synchronizing the superimposed auxiliary voltage with the load condition of the motor is achieved by multiplying the auxiliary voltage by the actual current value. The commutation signals which are required for controlling the power stage can be derived from the zero crossings of the voltage signals of the magnetic field sensors by using comparators.

DETAILED DESCRIPTION

Figure 1:
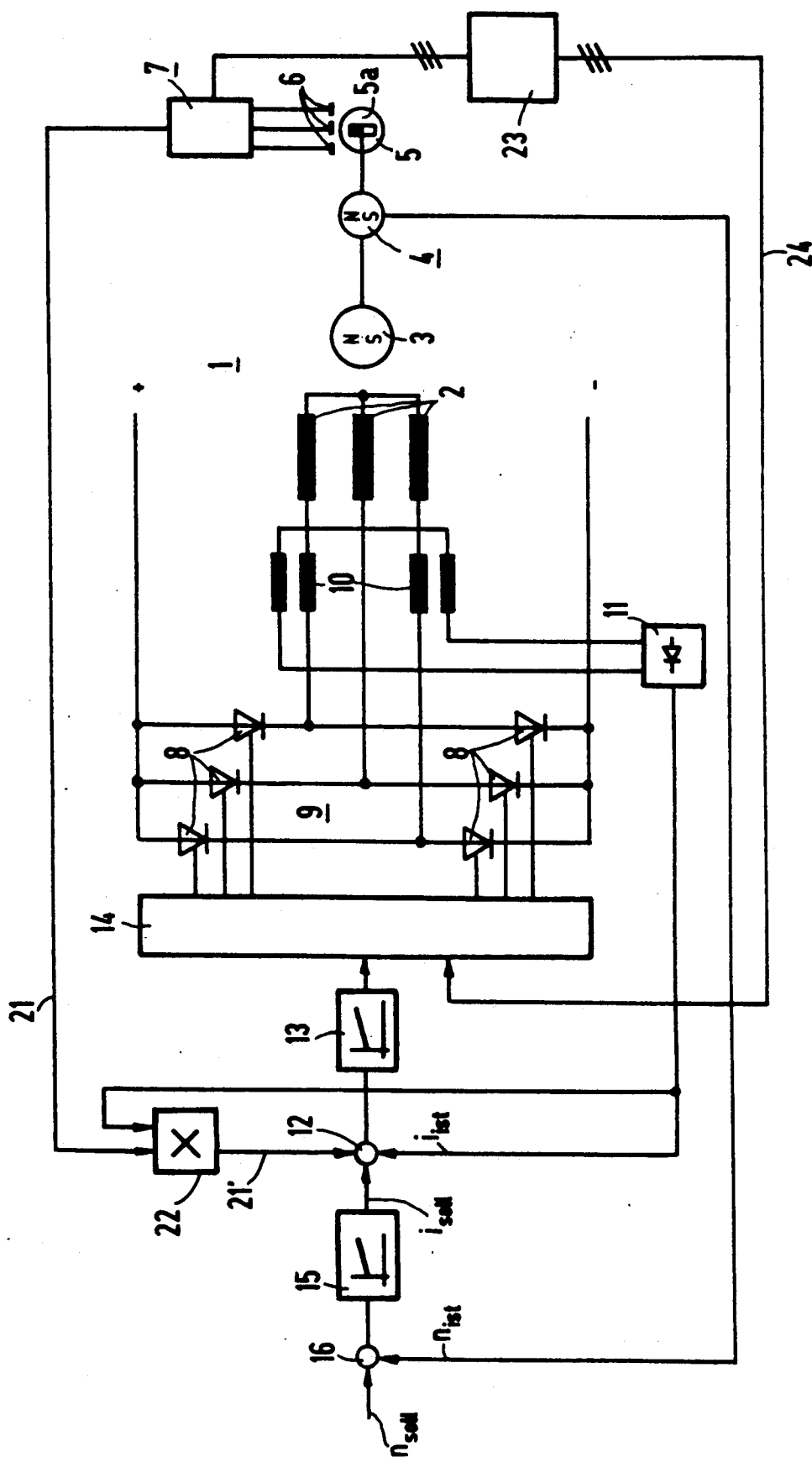
FIG. 1 is an overview of a drive system constructed according to an embodiment of the present invention.

Referring to FIG. 1, a three-phase drive system is shown. A three-phase drive motor 1 has a stator winding 2 and a permanent-magnet excited rotor 3. A tachometer 4 and a rotor-position sensor 5 are coupled to the rotor 3. The tachometer 4 and the rotor-position sensor 5 have the same number of poles as the drive motor. Corresponding to the number of phases of the drive motor 1, three magnetic field sensors 6 are assigned to the rotor part 5a of the rotor-position sensor 5. These magnetic field sensors supply their voltage signals to a processing unit 7. The rotor part 5a is studded with permanent magnets.

The stator winding 2 with its three phase strings contacts an electronic power stage 9. The electronic power stage consists of controllable semiconductor contact elements 8. The current transformers 10 are coupled in series to two phase strings of the stator winding 2, and the secondary sides of the current transformers 10 are coupled to rectifier diodes 11. The d.c. voltage signal which is delivered by the rectifier diodes 11 represents the actual current value $i_{ist}$. The actual current value $i_{ist}$ and the current setpoint $i_{soll}$ are supplied to a reference element 12. The differential signal formed by the reference element is applied to the input of a current regulator 13. The output of the current regulator 13 is coupled to an input of a selection control element 14. The control signals of the rotor-position sensor 5 are supplied to an additional input of the selection control element 14. The control electrodes of the controllable semiconductor contact element 8 are connected to the outputs of the selection control element 14. The control signal is delivered by the current regulator 13. Via the selection control element 14, the control signal is supplied to the control electrodes of those semiconductor contact elements 8 which must conduct current according to the position of the rotor 3 of the drive motor 1, as a function of the control signals of the rotor-position sensor 5.

Furthermore, the drive system also has a speed controlling device 15 overlapping the current regulator 13. The current regulator is superposed by a further reference element 16 which performs a comparison of the setpoint to actual values. For this purpose, a speed setpoint $n_{soll}$ and the actual speed value $n_{ist}$, which is delivered by the tachometer 4, are applied to the additional reference element 16.

Figure 3:
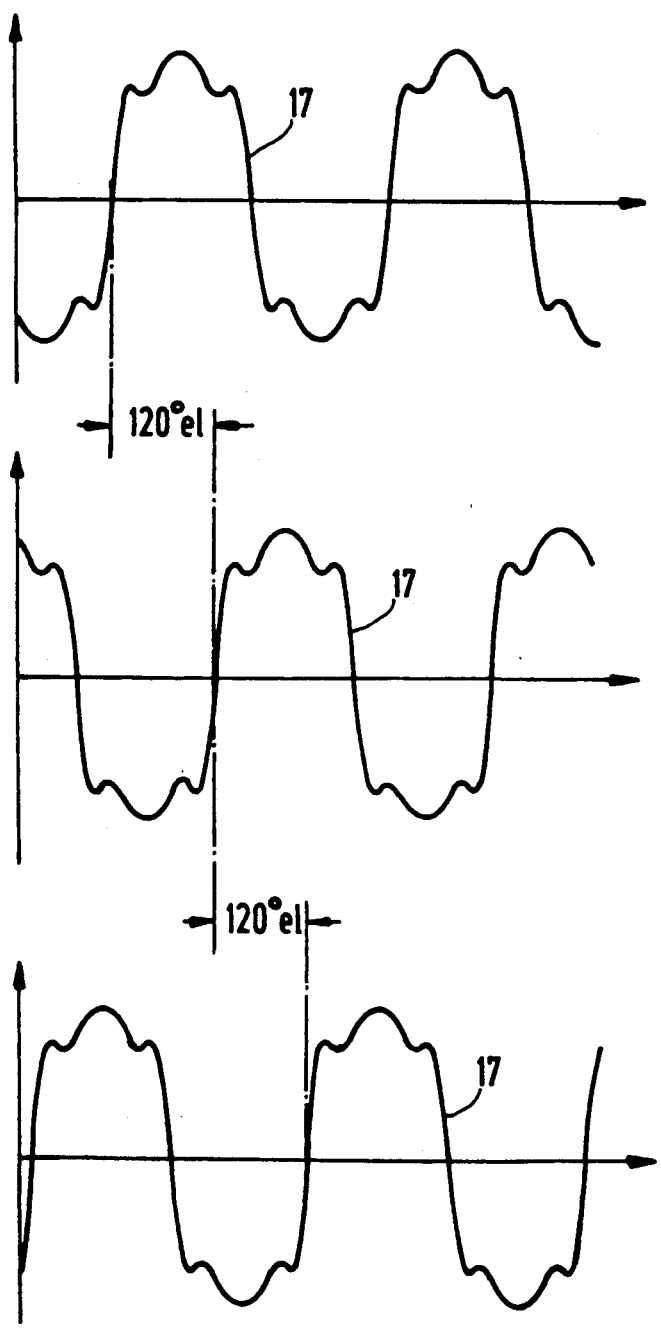
FIG. 3 shows in a line diagram, the voltage signals that are delivered by three magnetic field sensors each sensor electrically staggered against each other by 120°.

The magnetic field sensors 6 are mounted on the circumference of the rotor part 5a at a spatial angular distance of 360°/(p.m). The variable m corresponds to the phase number, and p to the number of pole pairs of the drive motor 1. In the case of a six pole, three-phase drive motor 1, a spatial distance of 40° thus results between two magnetic field sensors 6. The analog voltage signals 17, which are delivered by the three magnetic field sensors 6, thus have an electric phase shift of 120° to each other. The shape and phase relation of these voltage signals 17 can be seen in FIG. 3.

Figure 2:
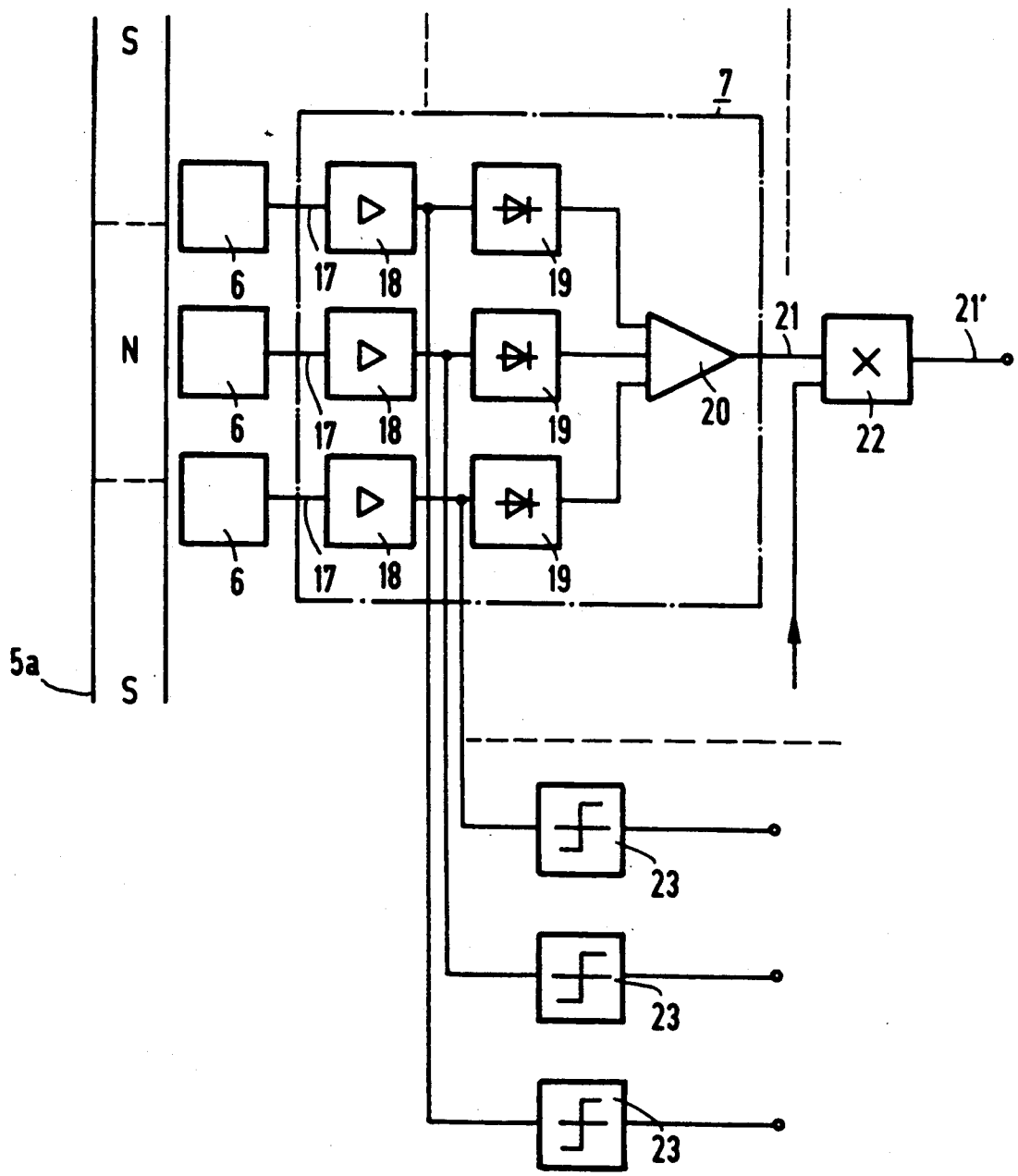
FIG. 2 is a block diagram of a processing module for the voltage signals of the magnetic field sensors of FIG. 1.

As shown in FIG. 2, the voltage signals 17 of the magnetic field sensors 6 are supplied to amplifiers 18 in the processing unit 7. Rectifiers 19 with outputs contacting an adding stage 20 are arranged downstream from these amplifiers 18. In the adding stage 20, the sum of the output signals of the rectifier 19 is formed and the d.c. voltage portion of the sum signal is filtered out. Thus, an output signal 21 corresponding to the rectified ripples of the voltage signal 17 of the magnetic field sensors 6 appears at the output of the adding stage 20.

Figure 4:
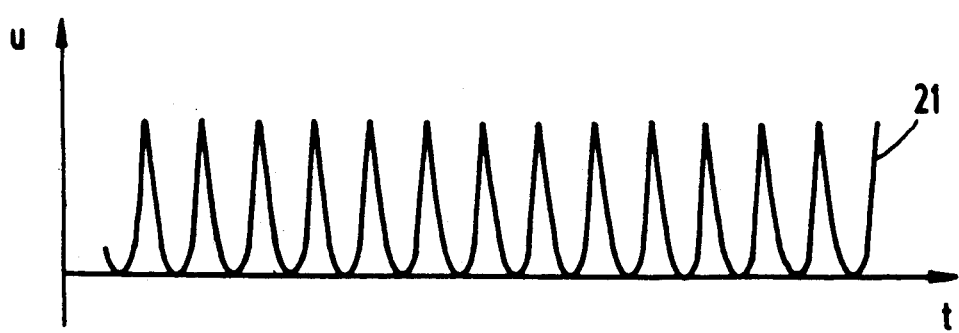
FIG. 4 shows in a line diagram, the auxiliary voltage obtained from the voltage signals after rectification and the filtering out of the d.c. voltage portion.

The shape of such an output signal 21 of the adding stage 20 is shown in FIG. 4. In a multiplying stage 22, which is arranged downstream from the processing unit 7, the output signal 21 is multiplied by the actual current value $i_{ist}$. Thus, the output signal 21 of the adding stage 20 is synchronized to the load conditions of the drive motor 1. The output signal 21' of the multiplying stage 22 represents the auxiliary voltage which overlaps the current setpoint $i_{soll}$. This overlapping takes place within the reference element 12.

As can be further seen in the representation in FIG. 2, the voltage signals 17 of the magnetic field sensors 6 are amplified by the amplifier 18 and also supplied to comparators 23. The comparators 23 are connected such that during the positive half cycle of the respective voltage signal 17 a commutation signal 24 appears at its output, thus controlling the corresponding semiconductor contact element 8 of the power stage 9. The beginning and end of the commutation signal 24 coincides with the corresponding zero crossings of the voltage signal 17.

Since the maximum of the output signal 2 of the processing unit 7, and thus the maximum of the output signal 21' of the multiplying stage 22 also conform with the zero crossings of the voltage signals 17 of the magnetic field sensors 6, the increase of the current setpoint $i_{soll}$ produced by the auxiliary voltage takes place in phase with the times of commutation. Consequently, a shifting of the increase in current setpoint corresponding to the phase of the instant of commutation no longer occurs. This shifting is normally caused by manufacturing tolerances. In this manner, such torque fluctuations are eliminated.

What is claimed is:

1. A device for a drive system comprising:
    a drive motor having a number of phases, said drive motor having a motor rotor, and having a plurality of poles;
    a current regulator receiving a current setpoint, said current regulator associated with said drive motor;
    an electronic power stage arranged downstream from said drive motor, said electronic power stage having a plurality of semiconductor contact elements;
    a rotor-position sensor, wherein said plurality of semiconductor contact elements are able to be controlled by said current regulator as a function of said rotor-position sensor, said rotor-position sensor having,
    a rotor part having a circumference and having a plurality of magnetic poles corresponding to a number of the plurality of poles of said drive motor, said rotor part being coupled to said motor rotor; and
    a plurality of magnetic field sensors corresponding to a phase number of said drive motor, said plurality of magnetic field sensors producing an analog voltage signal, said plurality of magnetic field sensors mounted or the circumference of the rotor part, in reference to each other, at a spacial distance of 360° divided by the number of phases and divided by a number of pairs of the plurality of poles of said drive motor, wherein the current setpoint that is supplied to said current regulator is increased by overlapping an auxiliary voltage derived from the analog voltage signal of said plurality of magnetic field sensors during an instant of commutation.

2. The device according to claim 1 wherein:
    said plurality of magnetic field sensors delivering the analog voltage signals with a shape deviating from a sinusoidal shape due to a configuration of the plurality of magnetic poles on said rotor part of said rotor-position sensor;
    the analog voltage signals change with respect to each other from one polarity to the other within specific angular dimensions, and do not overlap in time; and
    said current regulator receiving a rectified a.c. voltage portion of the analog voltage signal as the auxiliary voltage.

3. The device according to claim 2 wherein the analog voltage signals of said plurality of magnetic field sensors have a trapezoidal shape.

4. The device of claim 1, further comprising a multiplying stage multiplying the auxiliary voltage by an actual current value, and providing an output to overlap the current setpoint that is supplied to said current regulator thus synchronizing the auxiliary voltage with load conditions of said drive motor.

5. The device of claim 2, further comprising a multiplying stage multiplying the auxiliary voltage by an actual current value, and providing an output to overlap the current setpoint that is supplied to said current regulator thus synchronizing the auxiliary voltage with load conditions of said drive motor.

6. The device of claim 3, further comprising a multiplying stage multiplying the auxiliary voltage by an actual current value, and providing an output to overlap the current setpoint that is supplied to said current regulator thus synchronizing the auxiliary voltage with load conditions of said drive motor.

7. The device of claim 1 further comprising a plurality of comparators deriving commutation signals from zero crossings of the analog voltage signals of said plurality of magnetic field sensors, wherein the commutation signals are required for controlling said electronic power stage.

8. The device of claim 2 further comprising a plurality of comparators deriving commutation signals from zero crossings of the analog voltage signals of said plurality of magnetic field sensors, wherein the commutation signals are required for controlling said electronic power stage.

9. The device of claim 3 further comprising a plurality of comparators deriving commutation signals from zero crossings of the analog voltage signals of said plurality of magnetic field sensors, wherein the commutation signals are required for controlling said electronic power stage.

10. The device of claim 4 further comprising a plurality of comparators deriving commutation signals from zero crossings of the analog voltage signals of said plurality of magnetic field sensors, wherein the commutation signals are required for controlling said electronic power stage.

11. The device of claim 5 further comprising a plurality of comparators deriving commutation signals from zero crossings of the analog voltage signals of said plurality of magnetic field sensors, wherein the commutation signals are required for controlling said electronic power stage.

12. The device of claim 6 further comprising a plurality of comparators deriving commutation signals from zero crossings of the analog voltage signals of said plurality of magnetic field sensors, wherein the commutation signals are required for controlling said electronic power stage.

13. A method for removing irregularities in a torque characteristic in a drive system due to unavoidable manufacturing tolerances, comprising the steps of:
supplying a current setpoint to a current regulator;
controlling a plurality of semiconductor contact elements of an electronic power stage by the current regulator as a function of a rotor-position sensor;
deriving analog voltage signals from a plurality of magnetic field sensors mounted on a circumference of a. rotor part, and mounted in reference to each other at a spacial angular distance of 360° divided by a number of pairs of a plurality of poles of a drive motor and divided by a number of phases of the drive motor;
deriving an auxiliary voltage from the analog voltage signals of the plurality of magnetic field sensors during an instant of commutation; and
increasing the current setpoint that is supplied to the current regulator by overlapping the auxiliary voltage.

14. The method of claim 13 wherein the step of deriving analog voltage signals further includes deriving analog voltage signals from the plurality of magnetic field sensors which deviate from a sinusoidal shape due to a configuration of a plurality of magnetic poles on the rotor part of the rotor position sensor, which change from one polarity to the other within specific angular dimensions, and which do not overlap in time.

15. The method of claim 14 wherein the step of increasing the current setpoint by oVerlapping the auxiliary voltage further includes deriving the auxiliary voltage from a rectified a.c. voltage portion of the analog voltage signal.

16. The method of claim 13 wherein the step of deriving analog voltage signals produces analog voltage signals with trapezoidal shapes.

17. The method of claim 13 further comprising the steps of:
multiplying the auxiliary voltage by an actual current value in a multiplying stage; and
overlapping the output of the multiplying stage with the current setpoint that is supplied to the current regulator to synchronize the auxiliary voltage with the load conditions of the drive motor.

18. The method of claim 13 further including the steps of:
deriving commutation signals from zero crossings of the analog voltage signals of the plurality of magnetic field sensors; and
controlling the electronic power stage with the commutation signals.

19. The method of claim 14 further including the steps of:
deriving commutation signals from zero crossings of the analog voltage signals of the plurality of magnetic field sensors; and
controlling the electronic power stage with the commutation signals.

20. The method of claim 16 further including the steps of:
deriving commutation signals from zero crossings of the analog voltage signals of the plurality of magnetic field sensors; and
controlling the electronic power stage with the commutation signals.

* * * * *